United States Patent
Aziz et al.

(10) Patent No.: US 9,106,694 B2
(45) Date of Patent: Aug. 11, 2015

(54) ELECTRONIC MESSAGE ANALYSIS FOR MALWARE DETECTION

(75) Inventors: Ashar Aziz, Fremont, CA (US); Henry Uyeno, Sunnyvale, CA (US); Jay Manni, San Jose, CA (US); Muhammad Amin, Fremont, CA (US); Stuart Staniford, San Francisco, CA (US)

(73) Assignee: FireEye, Inc., Milpitas, CA (US)

( * ) Notice: Subject to any disclaimer, the term of this patent is extended or adjusted under 35 U.S.C. 154(b) by 224 days.

(21) Appl. No.: 13/089,191

(22) Filed: Apr. 18, 2011

(65) Prior Publication Data

US 2011/0314546 A1     Dec. 22, 2011

Related U.S. Application Data

(63) Continuation-in-part of application No. 11/717,474, filed on Mar. 12, 2007, which is a continuation-in-part of application No. 11/494,990, filed on Jul. 28, 2006, now Pat. No. 8,375,444, which is a (Continued)

(51) Int. Cl.
    *G08B 23/00*     (2006.01)
    *G06F 21/56*     (2013.01)
    *H04L 29/06*     (2006.01)

(52) U.S. Cl.
    CPC .............. *H04L 63/145* (2013.01); *G06F 21/56* (2013.01); *G06F 21/562* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 4,292,580 | A | 9/1981 | Ott et al. |
| 5,175,732 | A | 12/1992 | Hendel et al. |
| 5,440,723 | A | 8/1995 | Arnold et al. |
| 5,490,249 | A | 2/1996 | Miller |
| 5,657,473 | A | 8/1997 | Killean et al. |
| 5,842,002 | A | 11/1998 | Schnurer et al. |

(Continued)

FOREIGN PATENT DOCUMENTS

| | | |
|---|---|---|
| GB | 2439806 | 1/2008 |
| JP | 2003-256469 | 9/2003 |

(Continued)

OTHER PUBLICATIONS

Silicon Defense, "Worm Containment in the Internal Network", Mar. 2003, pp. 1-25.

(Continued)

*Primary Examiner* — Brandon Hoffman
(74) *Attorney, Agent, or Firm* — Rutan & Tucker LLP; William W. Schaal

(57) ABSTRACT

An electronic message is analyzed for malware contained in the message. Text of an electronic message may be analyzed to detect and process malware content in the electronic message itself. The present technology may analyze an electronic message and attachments to electronic messages to detect a uniform resource location (URL), identify whether the URL is suspicious, and analyze all suspicious URLs to determine if they are malware. The analysis may include re-playing the suspicious URL in a virtual environment which simulates the intended computing device to receive the electronic message. If the re-played URL is determined to be malicious, the malicious URL is added to a black list which is updated throughout the computer system.

51 Claims, 8 Drawing Sheets

Related U.S. Application Data continuation-in-part of application No. 11/471,072, filed on Jun. 19, 2006, now Pat. No. 8,584,239, which is a continuation-in-part of application No. 11/409,355, filed on Apr. 20, 2006, now Pat. No. 8,171,553, which is a continuation-in-part of application No. 11/096,287, filed on Mar. 31, 2005, now Pat. No. 8,528,086, and a continuation-in-part of application No. 11/151,812, filed on Jun. 13, 2005, now Pat. No. 8,549,638, and a continuation-in-part of application No. 11/152,286, filed on Jun. 13, 2005, now Pat. No. 8,006,305.

(60) Provisional application No. 60/559,198, filed on Apr. 1, 2004, provisional application No. 60/579,953, filed on Jun. 14, 2004, provisional application No. 60/579,910, filed on Jun. 14, 2004.

(56) References Cited

U.S. PATENT DOCUMENTS

| | | | |
|---|---|---|---|
| 5,978,917 | A | 11/1999 | Chi |
| 6,088,803 | A | 7/2000 | Tso et al. |
| 6,094,677 | A | 7/2000 | Capek et al. |
| 6,108,799 | A | 8/2000 | Boulay et al. |
| 6,269,330 | B1 | 7/2001 | Cidon et al. |
| 6,279,113 | B1 | 8/2001 | Vaidya |
| 6,298,445 | B1 | 10/2001 | Shostack et al. |
| 6,357,008 | B1 | 3/2002 | Nachenberg |
| 6,424,627 | B1 | 7/2002 | Sorhaug et al. |
| 6,484,315 | B1 | 11/2002 | Ziese |
| 6,487,666 | B1 | 11/2002 | Shanklin et al. |
| 6,493,756 | B1 | 12/2002 | O'Brien et al. |
| 6,550,012 | B1 | 4/2003 | Villa et al. |
| 6,775,657 | B1 | 8/2004 | Baker |
| 6,832,367 | B1 | 12/2004 | Choi et al. |
| 6,895,550 | B2 | 5/2005 | Kanchirayappa et al. |
| 6,898,632 | B2 | 5/2005 | Gordy et al. |
| 6,907,396 | B1 | 6/2005 | Muttik et al. |
| 6,981,279 | B1 | 12/2005 | Arnold et al. |
| 7,007,107 | B1 | 2/2006 | Ivchenko et al. |
| 7,028,179 | B2 | 4/2006 | Anderson et al. |
| 7,043,757 | B2 | 5/2006 | Hoefelmeyer et al. |
| 7,069,316 | B1 | 6/2006 | Gryaznov |
| 7,080,408 | B1 | 7/2006 | Pak et al. |
| 7,093,239 | B1 | 8/2006 | van der Made |
| 7,100,201 | B2 | 8/2006 | Izatt |
| 7,159,149 | B2 | 1/2007 | Spiegel et al. |
| 7,231,667 | B2 | 6/2007 | Jordan |
| 7,240,364 | B1 | 7/2007 | Branscomb et al. |
| 7,240,368 | B1 | 7/2007 | Roesch et al. |
| 7,251,215 | B1 | 7/2007 | Turner et al. |
| 7,287,278 | B2 | 10/2007 | Liang |
| 7,308,716 | B2 | 12/2007 | Danford et al. |
| 7,328,453 | B2 | 2/2008 | Merkle, Jr. et al. |
| 7,356,736 | B2 | 4/2008 | Natvig |
| 7,386,888 | B2 | 6/2008 | Liang et al. |
| 7,392,542 | B2 | 6/2008 | Bucher |
| 7,418,729 | B2 | 8/2008 | Szor |
| 7,428,300 | B1 | 9/2008 | Drew et al. |
| 7,441,272 | B2 | 10/2008 | Durham et al. |
| 7,448,084 | B1 | 11/2008 | Apap et al. |
| 7,458,098 | B2 | 11/2008 | Judge et al. |
| 7,464,404 | B2 | 12/2008 | Carpenter et al. |
| 7,464,407 | B2 | 12/2008 | Nakae et al. |
| 7,467,408 | B1 | 12/2008 | O'Toole, Jr. |
| 7,478,428 | B1 | 1/2009 | Thomlinson |
| 7,480,773 | B1 | 1/2009 | Reed |
| 7,487,543 | B2 | 2/2009 | Arnold et al. |
| 7,496,960 | B1 | 2/2009 | Chen et al. |
| 7,496,961 | B2 | 2/2009 | Zimmer et al. |
| 7,516,488 | B1 | 4/2009 | Kienzle et al. |
| 7,519,990 | B1 | 4/2009 | Xie |
| 7,523,493 | B2 | 4/2009 | Liang et al. |
| 7,530,104 | B1 | 5/2009 | Thrower et al. |
| 7,540,025 | B2 | 5/2009 | Tzadikario |
| 7,565,550 | B2 | 7/2009 | Liang et al. |
| 7,568,233 | B1 | 7/2009 | Szor et al. |
| 7,603,715 | B2 | 10/2009 | Costa et al. |
| 7,607,171 | B1 | 10/2009 | Marsden et al. |
| 7,639,714 | B2 | 12/2009 | Stolfo et al. |
| 7,644,441 | B2 | 1/2010 | Schmid et al. |
| 7,657,419 | B2 | 2/2010 | van der Made |
| 7,676,841 | B2 | 3/2010 | Sobchuk et al. |
| 7,698,548 | B2 | 4/2010 | Shelest et al. |
| 7,707,633 | B2 | 4/2010 | Danford et al. |
| 7,739,740 | B1 | 6/2010 | Nachenberg et al. |
| 7,779,463 | B2 | 8/2010 | Stolfo et al. |
| 7,784,097 | B1 | 8/2010 | Stolfo et al. |
| 7,849,506 | B1 | 12/2010 | Dansey et al. |
| 7,877,803 | B2 | 1/2011 | Enstone et al. |
| 7,904,959 | B2 | 3/2011 | Sidiroglou et al. |
| 7,908,660 | B2 | 3/2011 | Bahl |
| 7,930,738 | B1 | 4/2011 | Petersen |
| 7,937,761 | B1 | 5/2011 | Bennett |
| 7,996,556 | B2 | 8/2011 | Raghavan et al. |
| 7,996,836 | B1 | 8/2011 | McCorkendale et al. |
| 7,996,904 | B1 | 8/2011 | Chiueh et al. |
| 7,996,905 | B2 | 8/2011 | Arnold et al. |
| 8,006,305 | B2 | 8/2011 | Aziz |
| 8,010,667 | B2 | 8/2011 | Zhang et al. |
| 8,020,206 | B2 | 9/2011 | Hubbard et al. |
| 8,028,338 | B1 | 9/2011 | Schneider et al. |
| 8,045,094 | B2 | 10/2011 | Teragawa |
| 8,045,458 | B2 | 10/2011 | Alperovitch et al. |
| 8,069,484 | B2 | 11/2011 | Mcmillan et al. |
| 8,087,086 | B1 | 12/2011 | Lai et al. |
| 8,171,553 | B2 | 5/2012 | Aziz et al. |
| 8,201,246 | B1 | 6/2012 | Wu et al. |
| 8,204,984 | B1 | 6/2012 | Aziz et al. |
| 8,220,055 | B1 | 7/2012 | Kennedy |
| 8,233,882 | B2 | 7/2012 | Rogel |
| 8,234,640 | B1 | 7/2012 | Fitzgerald et al. |
| 8,234,709 | B2 | 7/2012 | Viljoen et al. |
| 8,239,944 | B1 | 8/2012 | Nachenberg et al. |
| 8,266,091 | B1 | 9/2012 | Gubin et al. |
| 8,286,251 | B2 | 10/2012 | Eker et al. |
| 8,291,499 | B2 | 10/2012 | Aziz et al. |
| 8,307,435 | B1 | 11/2012 | Mann et al. |
| 8,307,443 | B2 | 11/2012 | Wang et al. |
| 8,312,545 | B2 | 11/2012 | Tuvell et al. |
| 8,321,936 | B1 | 11/2012 | Green et al. |
| 8,321,941 | B2 | 11/2012 | Tuvell et al. |
| 8,332,571 | B1 | 12/2012 | Edwards, Sr. |
| 8,365,286 | B2 | 1/2013 | Poston |
| 8,370,938 | B1 | 2/2013 | Daswani et al. |
| 8,370,939 | B2 | 2/2013 | Zaitsev et al. |
| 8,375,444 | B2 | 2/2013 | Aziz et al. |
| 8,381,299 | B2 | 2/2013 | Stolfo et al. |
| 8,402,529 | B1 | 3/2013 | Green et al. |
| 8,464,340 | B2 | 6/2013 | Ahn et al. |
| 8,479,174 | B2 | 7/2013 | Chiriac |
| 8,479,276 | B1 | 7/2013 | Vaystikh et al. |
| 8,510,827 | B1 | 8/2013 | Leake et al. |
| 8,510,828 | B1 | 8/2013 | Guo et al. |
| 8,510,842 | B2 | 8/2013 | Amit et al. |
| 8,516,478 | B1 | 8/2013 | Edwards et al. |
| 8,516,593 | B2 | 8/2013 | Aziz |
| 8,528,086 | B1 | 9/2013 | Aziz |
| 8,539,582 | B1 | 9/2013 | Aziz et al. |
| 8,549,638 | B2 | 10/2013 | Aziz |
| 8,561,177 | B1 | 10/2013 | Aziz et al. |
| 8,566,946 | B1 | 10/2013 | Aziz et al. |
| 8,584,094 | B2 | 11/2013 | Dadhia et al. |
| 8,584,234 | B1 | 11/2013 | Sobel et al. |
| 8,584,239 | B2 | 11/2013 | Aziz et al. |
| 8,627,476 | B1 | 1/2014 | Satish et al. |
| 8,635,696 | B1 | 1/2014 | Aziz |
| 2001/0005889 | A1 | 6/2001 | Albrecht |
| 2001/0047326 | A1 | 11/2001 | Broadbent et al. |
| 2002/0018903 | A1 | 2/2002 | Kokubo et al. |
| 2002/0038430 | A1 | 3/2002 | Edwards et al. |
| 2002/0091819 | A1 | 7/2002 | Melchione et al. |

(56) References Cited

U.S. PATENT DOCUMENTS

| | | |
|---|---|---|
| 2002/0144156 A1 | 10/2002 | Copeland, III |
| 2002/0162015 A1 | 10/2002 | Tang |
| 2002/0166063 A1 | 11/2002 | Lachman et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0115483 A1 | 6/2003 | Liang |
| 2003/0188190 A1 | 10/2003 | Aaron et al. |
| 2003/0200460 A1 | 10/2003 | Morota et al. |
| 2003/0212902 A1 | 11/2003 | Van Der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0093513 A1 | 5/2004 | Cantrell et al. |
| 2004/0111531 A1 | 6/2004 | Staniford et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0265331 A1 | 12/2005 | Stolfo |
| 2006/0010495 A1 | 1/2006 | Cohen et al. |
| 2006/0015715 A1 | 1/2006 | Anderson |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0094730 A1 | 4/2007 | Bhikkaji et al. |
| 2007/0101435 A1 | 5/2007 | Konanka et al. |
| 2007/0143827 A1 | 6/2007 | Nicodemus et al. |
| 2007/0156895 A1 | 7/2007 | Vuong |
| 2007/0157306 A1 | 7/2007 | Elrod et al. |
| 2007/0171824 A1 | 7/2007 | Ruello et al. |
| 2007/0174915 A1* | 7/2007 | Gribble et al. ........ 726/24 |
| 2007/0192500 A1 | 8/2007 | Lum |
| 2007/0192858 A1 | 8/2007 | Lum |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0271446 A1 | 11/2007 | Nakamura |
| 2008/0005782 A1 | 1/2008 | Aziz |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0098476 A1 | 4/2008 | Syversen |
| 2008/0120722 A1 | 5/2008 | Sima et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0215742 A1 | 9/2008 | Goldszmidt et al. |
| 2008/0222728 A1 | 9/2008 | Chavez et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0320594 A1 | 12/2008 | Jiang |
| 2009/0007100 A1 | 1/2009 | Field et al. |
| 2009/0013408 A1 | 1/2009 | Schipka |
| 2009/0031423 A1 | 1/2009 | Liu et al. |
| 2009/0044024 A1 | 2/2009 | Oberheide et al. |
| 2009/0044274 A1 | 2/2009 | Budko et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0126015 A1 | 5/2009 | Monastyrsky et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0193293 A1 | 7/2009 | Stolfo et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0271867 A1 | 10/2009 | Zhang |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0077481 A1* | 3/2010 | Polyakov et al. ........ 726/24 |
| 2010/0083376 A1 | 4/2010 | Pereira et al. |
| 2010/0100718 A1 | 4/2010 | Srinivasan |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0251104 A1 | 9/2010 | Massand |
| 2010/0281102 A1* | 11/2010 | Chinta et al. ........ 709/203 |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2011/0041179 A1 | 2/2011 | Stahlberg |
| 2011/0047620 A1 | 2/2011 | Mahaffey et al. |
| 2011/0078794 A1 | 3/2011 | Manni et al. |
| 2011/0093951 A1 | 4/2011 | Aziz |
| 2011/0099633 A1 | 4/2011 | Aziz |

(56) References Cited

U.S. PATENT DOCUMENTS

| | | |
|---|---|---|
| 2011/0113231 A1 | 5/2011 | Kaminsky |
| 2011/0167493 A1 | 7/2011 | Song et al. |
| 2011/0167494 A1 | 7/2011 | Bowen et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0079596 A1 | 3/2012 | Thomas et al. |
| 2012/0084859 A1 | 4/2012 | Radinsky et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0222121 A1 | 8/2012 | Staniford et al. |
| 2012/0297489 A1 | 11/2012 | Dequevy |
| 2013/0014259 A1 | 1/2013 | Gribble et al. |
| 2013/0036472 A1 | 2/2013 | Aziz |
| 2013/0139264 A1 | 5/2013 | Brinkley et al. |
| 2013/0227691 A1 | 8/2013 | Aziz et al. |
| 2013/0246370 A1 | 9/2013 | Bartram et al. |
| 2013/0291109 A1 | 10/2013 | Staniford et al. |

FOREIGN PATENT DOCUMENTS

| | | |
|---|---|---|
| JP | 2004-240945 | 8/2004 |
| JP | 2005-56048 | 3/2005 |
| WO | 0206928 | 1/2002 |
| WO | 0223805 | 3/2002 |
| WO | WO 2007022454 | 2/2007 |
| WO | WO-2008/041950 | 4/2008 |
| WO | WO 2008084259 | 7/2008 |
| WO | WO2012145066 | 10/2012 |

OTHER PUBLICATIONS

Nojiri, D. et al., "Cooperative Response Strategies for Large Scale Attack Mitigation", DARPA Information Survivability Conference and Exposition, Apr. 22-24, 2003, vol. 1, pp. 293-302.

Moore, D. et al., "Internet Quarantine: Requirements for Containing Self-Propagating Code", INFOCOM, Mar.30-Apr. 3, 2003, vol. 3, pp. 1901-1910.

Williamson, Matthew M., "Throttling Viruses: Restricting Propagation to Defeat Malicious Mobile Code", ACSAC Conference, Dec. 2002, Las Vegas, NV, USA, pp. 1-9.

"Packet", Microsoft Computer Dictionary, Microsoft Press, Mar. 2002, 1 pg.

Costa, M. et al. "Vigilante: End-to-End Containment of Internet Worms," SOSP '05, Oct. 23-26, 2005, Association for Computing Machinery, Inc., Brighton U.K.

Chaudet, C. et al. "Optimal Positioning of Active and Passive Monitoring Devices," International Conference on Emerging Networking Experiments and Technologies, Proceedings of the 2005 ACM Conference on Emerging Network Experiment and Technology, Oct. 2005, pp. 71-82, CoNEXT '05, Toulousse, France.

Crandall, J.R. et al., "Minos: Control Data Attack Prevention Orthogonal to Memory Model," 37th International Symposium on Microarchitecture, Dec. 2004, Portland, Oregon.

Kim, H. et al., "Autograph: Toward Automated, Distributed Worm Signature Detection," Proceedings of the 13th Usenix Security Symposium (Security 2004), Aug. 2004, pp. 271-286, San Diego.

Kreibich, J. et al., "Honeycomb—Creating Intrusion Detection Signatures Using Honeypots" 2nd Workshop on Hot Topics in Networks (HotNets-11), 2003, Boston, USA.

Newsome, J. et al., "Polygraph: Automatically Generating Signatures for Polymorphic Worms," in Proceedings of the IEEE Symposium on Security and Privacy, May 2005, pp. 226-241.

Newsome, J. et al., "Dynamic Taint Analysis for Automatic Detection, Analysis, and Signature Generation of Exploits on Commodity Software," in Proceedings of the 12th Annual Network and Distributed System Security, Symposium (NDSS '05), Feb. 2005.

Singh, S. et al., "Automated Worm Fingerprinting," Proceedings of the ACM/USENIX Symposium on Operating System Design and Implementation, Dec. 2004, San Francisco, California.

Margolis, P.E., "Computer & Internet Dictionary 3rd Edition," ISBN 0375603519, Dec. 1998.

Whyte, D. et al. "DNS-Based Detection of Scanning Worms in an Enterprise Network," Proceedings of the 12th Annual Network and Distributed System Security Symposium, Feb. 2005. 15 pages.

Kristoff, J. "Botnets, Detection and Mitigation: DNS-Based Techniques," NU Security Day 2005, 23 pages.

IEEE Xplore Digital Library Search Results for "detection of unknown computer worms". Http://ieeexplore.ieee.org/searchresult.jsp?SortField=Score&SortOrder=desc&ResultC . . . Accessed on Aug. 28, 2009.

AltaVista Advanced Search Results. "Event Orchestrator". Http://www.altavista.com/web/results?Itag=ody&pg=aq&aqmode=aqa=Eventi+Orchestrator . . . Accessed on Sep. 3, 2009.

AltaVista Advanced Search Results. "attack vector identifier". Http://www.altavista.com/web/results?Itag=ody&pg=aq&aqmode=aqa=attack+vector+ide . . . Accessed on Sep. 15, 2009.

Cisco, *Configuring the Catalyst Switched Port Analyzer (SPAN)* ("Cisco"), 2003.

Reiner Sailer, Enriquillo Valdez, Trent Jaeger, Roonald Perez, Leendert van Doorn, John Linwood Griffin, Stefan Berger., *sHype: Secure Hypervisor Appraoch to Trusted Virtualized Systems* (Feb. 2, 2005) ("Sailer").

Excerpt regarding First Printing Date for Merike Kaeo, *Designing Network Security* ("Kaeo"), 2004.

*The Sniffers's Guide to Raw Traffic* available at: yuba.stanford.edu/~casado/pcap/section1.html.

"Network Security: NetDetector—Network Intrusion Forensic System (NIFS) Whitepaper", ("*NetDetector Whitepaper*"), 2003.

"When Virtual is Better Than Real", *IEEEXplore Digital Library*, available at, http://ieeexplore.ieee.org/xpl/articleDetails.jsp?reload=true&arnumber=990073, 2001.

Adetoye, Adedayo , et al., "Network Intrusion Detection & Response System", ("*Adetoye*"),(Sep. 2003).

Baecher, "The Nepenthes Platform: An Efficient Approach to collect Malware", *Springer-verlag* Berlin Heidelberg, (2006), pp. 165-184.

Bayer, et al., "Dynamic Analysis of Malicious Code", *J Comput Virol*, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("*Boubalos*"), (Jun. 5, 2003).

Cohen, M.I. , "PyFlag—An advanced network forensic framework", *Digital investigation 5*, Elsevier, (2008), pp. S112-S120.

Distler, "Malware Analysis: An Introduction", *SANS Institute InfoSec Reading Room*, SANS Institute, (2007).

Dunlap, George W. , et al., "ReVirt: Enabling Intrusion Analysis through Virtual-Machine Logging and Replay", *Proceeding of the 5th Symposium on Operating Systems Design and Implementation, USENIX Association*, ("Dunlap"), (Dec. 9, 2002).

Hjelmvik, Erik , "Passive Network Security Analysis with NetworkMiner", *(IN)SECURE*, Issue 18, (Oct. 2008), pp. 1-100.

Kaeo, Merike , "Designing Network Security", ("Kaeo"), (Nov. 2003).

King, Samuel T., et al., "Operating System Support for Virtual Machines", ("King"), 2003.

Krasnyansky, Max , et al., *Universal TUN/TAP driver*, available at https://www.kernel.org/doc/Documentation/networking/tuntap.txt (2002) ("Krasnyansky").

Liljenstam, Michael , et al., "Simulating Realistic Network Traffic for Worm Warning System Design and Testing", *Institute for Security Technology studies*, Dartmouth College, ("Liljenstam"), (Oct. 27, 2003).

Marchette, David J., "Computer Intrusion Detection and Network Monitoring: A Statistical Viewpoint", ("Marchette"), (2001).

Natvig, Kurt , "SandboxII: Internet", *Virus Bulletin Conference*, ("Natvig"), (Sep. 2002).

(56) References Cited

OTHER PUBLICATIONS

Peter M. Chen, and Brian D. Noble, "When Virtual Is Better Than Real, Department of Electrical Engineering and Computer Science", *University of Michigan* ("Chen"), 2001.

Spitzner, Lance, "Honeypots: Tracking Hackers", ("Spizner"), (Sep. 17, 2002).

Thomas H. Ptacek, and Timothy N. Newsham "Insertion, Evasion, and Denial of Service: Eluding Network Intrusion Detection", *Secure Networks*, ("Ptacek"), (Jan. 1998).

Venezia, Paul, "NetDetector Captures Intrusions", *InfoWorld Issue 27*, ("Venezia"), (Jul. 14, 2003).

International Search Report and Written Opinion mailed May 10, 2012 in Application No. PCT/US12/21916.

International Search Report and Written Opinion mailed May 25, 2012 in Application No. PCT/US12/26402.

Abdullah, et al., Visualizing Network Data for Intrusion Detection, 2005 IEEE Workshop on Information Assurance and Security, pp. 100-108.

Apostolopoulos, George; Hassapis, Constantinos; :"V-eM: A Cluster of Virtual Machines for Robust, Detailed, and High-Performance Network Emulation", 14th IEEE International Symposium on Modeling, Analysism and Simulation of Computer and Telecommunication Systems, Sep. 11-14, 2006, pp. 117-126.

Aura, Tuomas, Thomas A. Kuhn, and Michael Rose. "Scanning electronic documents for personally identifiable information." Proceedings of the 5th ACM workshop on Privacy in electronic society. ACM, 2006.

Baldi, Mario; Risso, Fulvio; "A Framework for Rapid Development and Portable Execution of Packet-Handling Applications", 5th IEEE International on Signal Processing and Information Technology, Dec. 21, 2005, pp. 233-238.

Deutsch, P. and J.L. Gailly. "Zlib compressed data format specification version 3.3", RFC 1950, (1996).

Filiol, Eric, et al. "Combinational Optimisation of Worm Propagation on an Unknown Network," International Journal of Computer Science 2.2 (2007).

Goel et al., Reconstructing System State for Intrusion Analysis, Apr. 2008 SIGOPS Operating Systems Review, vol. 42, Issue 3, pp. 21-28.

Morales, Jose A., et al., "Analyzing and exploiting network behaviors of malware.", Security and Privacy in Communication Networks. Springer Berlin Heidelberg, 2010. 20-34.

NetBIOS Working Group. Protocol Standard for a NetBIOS Service on a TCP/UDP transport: Concepts and Methods. STD 19, RFC 1001, Mar. 1987.

Rautiainen et al., "A look at Portable Document Format Vulnerabilities", Information Security Technical Report, Elsevier Advanced Technology, Amsterdam, NL, vol. 14, No. 1, Feb. 1, 2009, pp. 30-33, XP026144094, ISSN: 1363-4127, DOI: 10.1016/J.ISTR.2009.04.001.

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Anonymous, "Inside Adobe Reader Protected Mode—Part 1—Design", Oct. 5, 2010, XP055116424, Retrieved from Internet: URL:http//blogs.adobe.com/security/2010/10/inside-adobe-reader-protected-mode-part-1-design.html [retrieved on May 6, 2014].

United States Patent and Trademark Office, Before the Patent Trial and Appeal Board, *Finjan, Inc.*, Petitioner v. *FireEye, Inc.*, Patent Owner., Case IPR2014-00344, Patent 8,291,499 B2, Before Bryan F. Moore, Lynne E. Pettigrew, and Francis L. Ippolito, Administrative Patent Judges., Ippolito, Administrative Patent Judge., Decision, Institution of Inter Partes Review, 37 C.F.R. 42.108, Entered: Jul. 21, 2014, 36 pages.

Extended European Search Report mailed Oct. 30, 2014, Application No. 127743151-1862/2700009, PCT/US2012026402.

\* cited by examiner

ELECTRONIC MESSAGE ANALYSIS FOR MALWARE DETECTION

CROSS-REFERENCE TO RELATED APPLICATIONS

This application is a continuation-in-part of U.S. patent application Ser. No. 11/717,474, filed Mar. 12, 2007, entitled "Systems and Methods for Malware Attack Prevention", which is a continuation-in-part of U.S. patent application Ser. No. 11/494,990, filed Jul. 28, 2006, now U.S. Pat. No. 8,375,444, issued Feb. 12, 2013 entitled "Dynamic Signature Creation and Enforcement", which is a continuation-in-part of U.S. patent application Ser. No. 11/471,072, filed Jun. 19, 2006, entitled "Virtual Machine with Dynamic Flow Analysis", which is a continuation-in-part of U.S. patent application Ser. No. 11/409,355, filed Apr. 20, 2006, now U.S. Pat. No. 8,171,553, issued May 1, 2012 entitled "Heuristic Based Capture with Replay to Virtual Machine", which is a continuation-in-part of U.S. patent application Ser. No. 11/096,287, filed Mar. 31, 2005, entitled "System and Method of Detecting Computer Worms", and is a continuation-in-part of U.S. patent application Ser. No. 11/151,812, filed Jun. 13, 2005, entitled "System and Method of Containing Computer Worms," and is a continuation-in-part of U.S. patent application Ser. No. 11/152,286, Jun. 13, 2005, now U.S. Pat. No. 8,006,305, issued Aug. 23, 2011 entitled "Computer Worm Defense System and Method", U.S. patent application Ser. No. 11/096,287 claims the benefit of U.S. Provisional Application No. 60/559,198 filed on Apr. 1, 2004, U.S. patent application Ser. No. 11/151,812 claims the benefit of U.S. Provisional Application No. 60/579,953 filed on Jun. 14, 2004, and the U.S. patent application Ser. No. 11/152,286 claims the benefit of U.S. Provisional Application No. 60/579,910 filed on Jun. 14, 2004, all of which are incorporated by reference herein.

BACKGROUND

Presently, malicious network content (e.g., malicious software or malware) can attack various devices via a communication network. For example, malware may include any program or file that is harmful to a computer user, such as bots, computer viruses, worms, Trojan horses, adware, spyware, or any programming that gathers information about a computer user or otherwise operates without permission.

Various processes and devices have been employed to prevent the problems that malicious network content can cause. For example, computers often include antivirus scanning software that scans a particular client device for viruses. Computers may also include spyware and/or adware scanning software. The scanning may be performed manually or based on a schedule specified by a user associated with the particular computer, a system administrator, and so forth. Unfortunately, by the time a virus or spyware is detected by the scanning software, some damage on the particular computer or loss of privacy may have already occurred. Additionally, it can take days or weeks for new Anti-Virus signatures to be manually created and for an anti-virus application to be updated, by which time malware authors will have already created new versions that evade the signatures. Moreover, polymorphic exploits are also an issue that limits the effectiveness of some anti-virus applications.

Malicious network content may be distributed over a network via web sites, e.g., servers operating on a network according to an HTTP standard. Malicious network content distributed in this manner may be actively downloaded and installed on a user's computer, without the approval or knowledge of the user, simply by accessing the web site hosting the malicious network content. The web site hosting the malicious network content may be referred to as a malicious web site. The malicious network content may be embedded within data associated with web pages hosted by the malicious web site. For example, a web page may include JavaScript code, and malicious network content may be embedded within the JavaScript code. In this example, the malicious network content embedded within the JavaScript code may be obfuscated such that it is not apparent until the JavaScript code is executed that the JavaScript code contains malicious network content. Therefore, the malicious network content may attack or infect a user's computer before detection by antivirus software, firewalls, intrusion detection systems, or the like.

Additionally, malicious network content may be distributed by electronic messages, including email, using such protocols as POP, SMTP, IMAP, and various forms of web-based email. Malicious content may be directly attached to the message (for example as a document capable of exploiting a document reading application, such as a malicious Microsoft Excel document). Alternatively, electronic messages may contain URL links to malicious content hosted on web servers elsewhere on the network. When target users click on such links, they may be infected from the web in the manner described above. These techniques for infecting user computers via electronic messages are often used to make targeted attacks on particular "high-value" users at organizations, such as executives or key technical or operational staff.

What is needed is an improved system for detecting malicious content propagated in electronic messages.

SUMMARY

The present technology analyzes an electronic message for malware contained in the message. Systems that analyze electronic messages typically analyze attached files for malware. The content of an electronic message itself may contain text, which is usually not examined by malware systems. The present technology analyzes text of an electronic message to detect and process malware content in the electronic message itself. In some embodiments, the present technology may analyze an electronic message to detect a uniform resource location (URL), identify whether the URL is suspicious, and analyze all suspicious URLs to determine if they are malware. The analysis may include re-playing the suspicious URL in a virtual environment which simulates the intended computing device to receive the electronic message. If the re-played URL is determined to be malicious, the malicious URL is added to a black list which is updated throughout the computer system.

In an embodiment, malicious network content may be detected by a network content processing system by receiving an electronic message. The electronic message may be determined to include content determined to be suspicious. The suspicious electronic message content may be executed in a virtual environment. The suspicious electronic message content may be identified as malicious based on execution of the suspicious electronic message content in the virtual environment.

DETAILED DESCRIPTION

Figure 1:
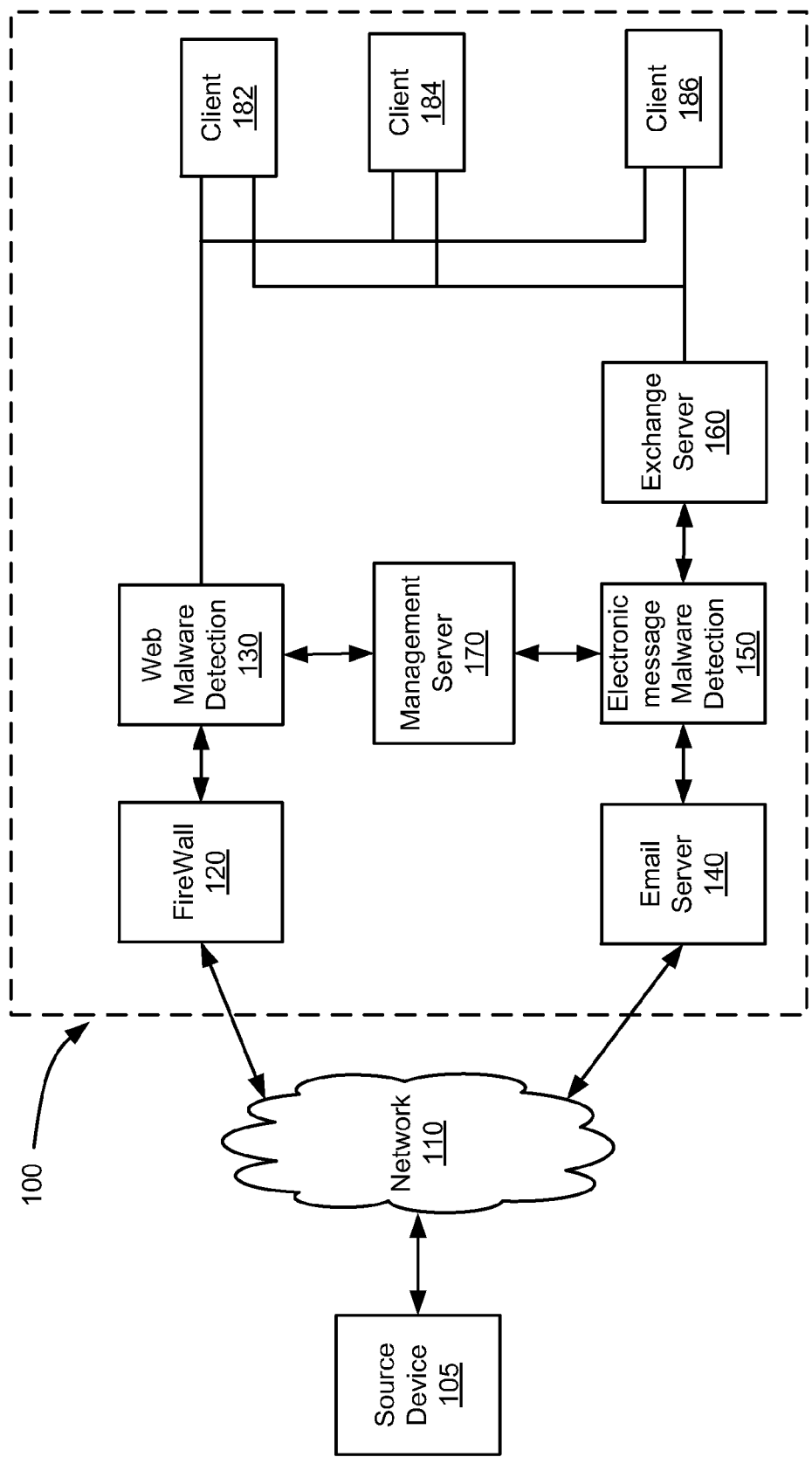
FIG. 1 is a block diagram of an exemplary system for detecting malicious electronic messages.

The present technology analyzes electronic messages for malware contained in the message. Systems that analyze electronic messages typically analyze attached files for malware in synthetic environments such as a virtual environment. Unlike prior systems, the present technology may analyze the content of an electronic message to detect malware in the message content. For example, the content may include a uniform resource locator (URL) address. The URL address may be analyzed to determine if the URL address is associated with malware. Additionally, the present technology may analyze attachments in a real operating system running in an instrumented virtual environment. In addition to analyzing the content within an email itself, the present technology may process attachments for emails that provide a location associated with malware. The attachments may include one or more files compatible with common applications, including Word, Excel and Powerpoint applications by Microsoft Corporation, of Redmond, Wash., and Adobe Reader application, by Adobe Systems Inc., of San Jose, Calif.

In some embodiments, the present technology may analyze an electronic message to detect a URL, identify whether the URL is suspicious, and analyze the suspicious URL to determine if it describes a location associated with malware. Determining if the URL is suspicious may include if comparing the URL to one or more lists of URLs. For example, the URL may be compared to a white list of acceptable URLS, a black list of malware URLs, and/or a list having a combination of URLs. If the URL is not found on any list, the URL is not determined to be malware and not determined to be acceptable, and therefore may be determined to be suspicious.

Analysis of a suspicious URL may include re-playing the suspicious URL in a virtual environment which simulates the intended computing device to receive the electronic message. Re-playing a URL may include executing the URL by a virtual component in the virtual environment to request content located from the URL address. Content is received by the virtual environment in a URL request response, the received content is loaded into the virtual environment, and executed while the virtual environment is monitored. If the re-played URL is determined to be malicious, the malicious URL is added to a black list which is updated throughout the computer system.

The electronic message content, for example a URL, may be identified as malicious by a first device or module that processes electronic messages to detect malware. Other first devices or modules in the system may process network traffic to detect malware. A central device or module may communicate with both the network traffic malware module and the electronic message malware module. In some embodiments, the central module may receive URLs detected to be malicious, may update a central URL blacklist based on the received URLs, and may transmit the updated URL blacklist to both the network traffic malware module and the electronic message malware module. This may cause a network malware module to examine more closely web traffic returning from requests to URLs passed in email, for example making it more likely that such web traffic was replayed in a virtual environment.

FIG. 1 is block diagram of an exemplary system for detecting malicious electronic messages. The system of FIG. 1 includes source device 105, network 110 and malware detection system 100. Malware detection system 100 includes firewall 120, web malware detection device 130, electronic message server 140, electronic message malware detection device 150, exchange server 160, management server 170, client device 182, client device 84 and client device 186. Though blocks within system 100 may be discussed herein as different devices, such as web malware detection 130 and electronic message malware detection 150, blocks of system 100 may be implemented as modules within a single device or combination of devices.

Source device 105 may transmit electronic messages and content page content, such as web page content, to malware detection system 100 over network 110. System 100 may receive network traffic content through firewall 120 and may receive electronic message content through electronic message server 140 via network 110.

Network 110 may transmit electronic message, content page, and other content between devices connected to network 110, including web malware detection system 130, electronic message malware detection system 150, and source device 105. Network 110 may include one or more private networks, public networks, LANs, WANs, intranets, the Internet, and a combination of these networks.

Firewall 120 may be a device that consists of hardware and/or software that detects and prevents unauthorized network traffic from being received by or sent by client devices 182, 184 and 186. Firewall 120 may communicate with network 110 and web malware detection system 130.

Web malware detection 130 may communicate with management server 170 and client devices 182-186. Web malware detection 130 may operate to intercept network traffic and analyze intercepted traffic to determine whether the traffic is malware. The intercepted traffic may be copied by web malware detection 130 and analyzed using heuristics and other techniques. The heuristics may be used to identify portions of the network traffic as suspicious. Portions of traffic not identified as suspicious are ignored and passed through web malware detection 130. The suspicious network traffic portions may be analyzed by replaying the traffic in a virtual environment. The replay may be monitored and used to identify malware content by web malware detection 130. A system for re-playing intercepted traffic in a virtual environment using virtual components is described in U.S. patent application Ser. No. 12/359,252, entitled "Detecting Malicious Network Content Using Virtual Environment Components", filed Jan. 23, 2009, the disclosure of which is incorporated herein by reference.

Electronic message server 140 may receive and send electronic messages between network 110 and electronic message malware detection 150.

Electronic message malware detection 150 may communicate with exchange server 160, management server 170, and email server 140, and may be implemented on one or more devices such a mail transfer agents (MTAs). Electronic message malware detection 150 may intercept electronic message traffic directed towards client devices 182-186. Electronic message malware detection 150 may include logic which analyzes electronic messages transmitted to and from electronic message 140 to identify malicious content within the electronic message. Identifying malware may include identifying an electronic message as suspicious, analyzing suspicious electronic messages to identify a malicious message, and communicating the malicious content to management server 170 to inform the remainder of system 100. Analyzing the suspicious electronic message may include replaying a portion of the electronic message in a virtual environment and monitoring the replay of the content. In some embodiments, content examined by electronic message malware detection 150 may include a URL detected within the body or header of an electronic message received by system 100.

Exchange server 160 may transfer mail between client devices 182-186 and electronic message malware detection 150. Management server 170 may receive malicious URL notifications, aggregate the received URLs, and update a black list maintained at management server 170. The malicious URL notification may be received from system 150 or system 130. Management server 170 may also transmit the black list of URLs to web malware detection systems and electronic message malware detection systems throughout system 100.

Clients 182, 184 and 186 may be any kind of device within a system 100 on which one or more users may execute programs to access network content such as a web page and transmit electronic messages such as an electronic message, instant message, or other electronic message.

Figure 2:
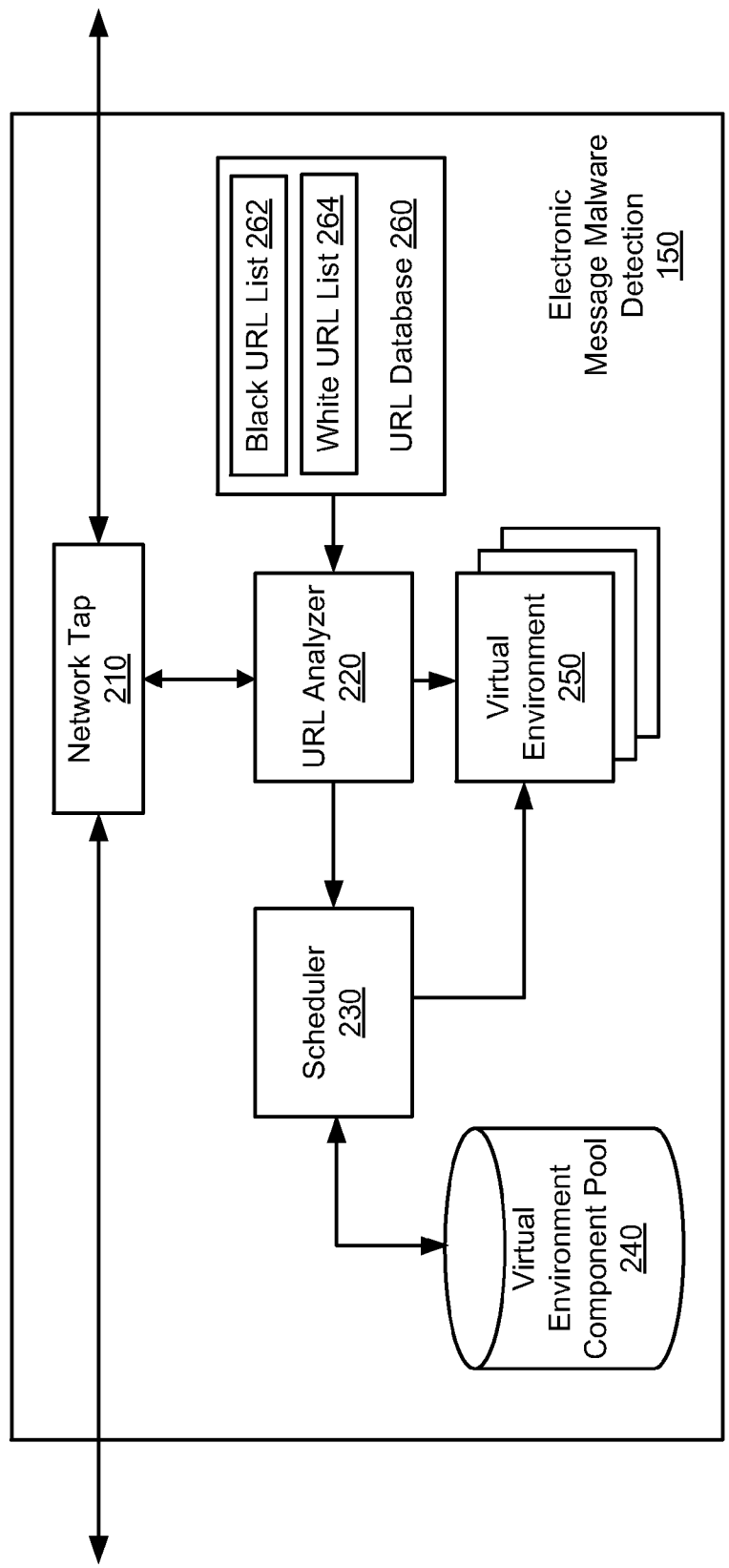
FIG. 2 is a block diagram of an exemplary e-mail malware detection module.

FIG. 2 is a block diagram of an exemplary electronic message malware detection system. The system of FIG. 2 includes network tap 210, URL analyzer 220, scheduler 230, virtual environment component pool 240, virtual environment 250 and URL database 260. Network tap 210 may intercept electronic messages such as electronic message and instant messages transmitted between electronic message server 140 and exchange server 160. Network tap 210 may make a copy of the electronic message to analyze within electronic message malware detection system 150. Though electronic messages may include email as well as other types of messages, email will be discussed herein as merely an example.

URL analyzer 220 may detect URLs within a detected electronic message. Detecting a URL may include parsing the header and the body of an electronic message to identify a URL within the electronic message. Upon detecting a URL within a message, URL analyzer determines if the URL is suspicious and initiates an analysis of any suspicious URL. A URL may be suspicious if it does not appear in a list of acceptable URLs (a white list) and does not appear in a list of malware URLs (black list).

Upon detecting a suspicious URL, URL analyzer 220 provides the URL to scheduler 230. Scheduler 230 receives suspicious URLs and retrieves virtual environment components from virtual environment component pool 240. The virtual environment components may include components intended to replicate the actual environment at a client device intended to receive the electronic message. For example, the virtual environments may include a virtual operating system, virtual applications, and a virtual network intended to replicate those associated with a particular client device intended to receive the message. Scheduler 230 then provides the URL and the retrieved virtual environment components to a virtual environment 250 in order to replay the URL within a virtual environment.

Virtual environment 250 receives the suspicious URL and virtual environment components and replays the URL within a virtual environment having the virtual components. Replaying the URL may be similar to performing a "click" operation on the suspicious URL. Upon performing a click on the URL, a request is sent to the URL for content, and the network server associated with the URL provides content and a response to the request. The content received in response to the request is then processed by the virtual environment and the environment is monitored to determine if any undesirable behavior occurs. If any undesirable behavior occurs in response to loading content associated with the URL, the URL is determined to be malware and added to a local black list by electronic message malware detection system 150. Undesirable behavior may unauthorized requests for data, sending or receiving data over a network, processing and/or storing data, changing a registry value, installing a file, executing a file, or other operations. The internal malware black list is transmitted to management server 170.

URL database 260 includes black URL list 262 and white URL list 264. URL analyzer may compare URLs detected in electronic messages to black URL list 262 to determine if there is a match. If there is a match, the URL is detected to be malware, and the electronic message may be blocked or the URL may be removed from the electronic message. If the URL is removed from the electronic message, an alert may be generated (e.g., within the message) indicating the URL has been removed and an administrator may be notified. If a detected URL matches a URL on the white URL list 264, the URL is determined to be acceptable and no further action is taken. If a detected URL does not match a URL on black URL list 262 or white URL list 264, the URL is identified as being suspicious and is processed in a virtual environment.

Figure 3:
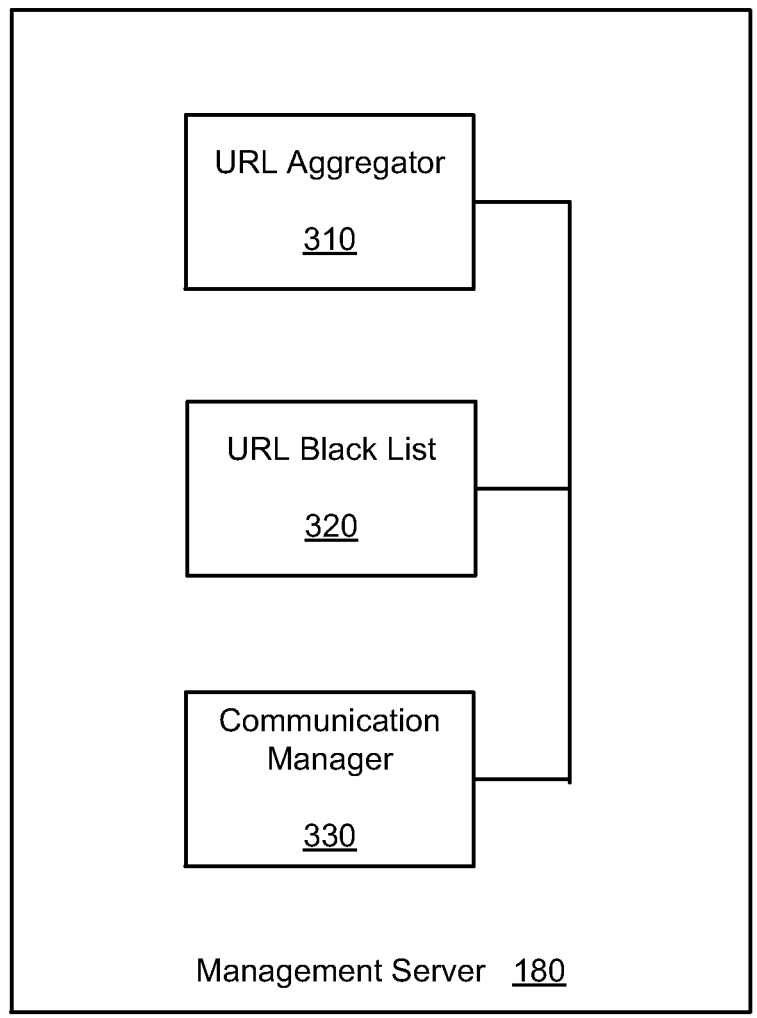
FIG. 3 is a block diagram of an exemplary management server.

FIG. 3 is a block diagram of an exemplary management server. Management server 180 of FIG. 3 includes URL aggregator 310, URL black list 320, and communication manager 330. URL aggregator 310 aggregates received URLs and updates and stores URL black list 320. URL black list 320 is a list of confirmed malicious URLs maintained by management server 180. Communication manager 330 may receive URLs from electronic message malware detection systems and web malware detection systems within system 100. Communication manager 330 may provide the URLs to URL aggregator 310 to aggregate the URLs and update URL black list 320 maintained on management server 180. Communication manager 330 may also send the current URL black list to malware detection systems within system 100.

Figure 4:
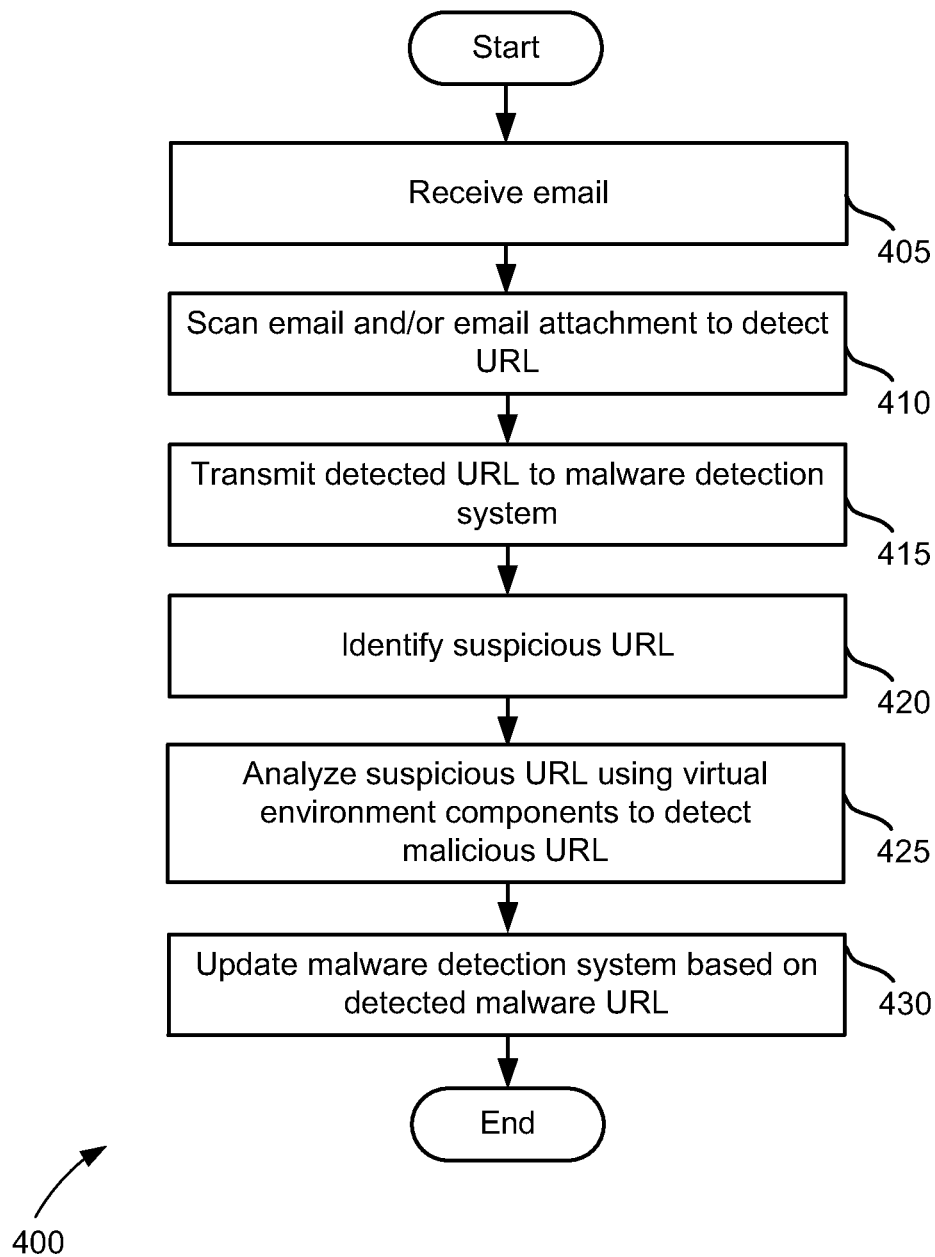
FIG. 4 is a flowchart of an exemplary method for detecting malicious electronic messages.

FIG. 4 is a flowchart of an exemplary method for detecting malicious electronic messages. Though FIG. 4 will be discussed in terms of an electronic message, other electronic messages, such as an instant message or other forms of communication, may be processed by the present technology.

An electronic message is received at step 405. The electronic message may be received by electronic message malware detection system 150 via electronic message server 140. The electronic message and/or an attachment to the message may be scanned to detect a URL at step 410. The electronic message may be scanned by a URL analyzer module to detect a URL in the electronic message header, body or other portion of the electronic message. The attachment may be scanned to detect a URL within the attachment. For example, if the attachment is a word processor or spreadsheet document, the attachment may be scanned to detect a URL in text of the word processor document or within a cell of the spreadsheet.

Detected URLs may be transmitted to a malware detection system at step 415. The malware detection system may be contained locally on electronic message malware detection system 150 or outside detection module 150. For example, electronic message malware detection system 150 may transmit detected URLs to web malware detection system 130 to process the URL to determine if the URL is malicious. In some embodiments, a URL is simply stored locally at electronic message malware detection system 150 at step 415 for further processing.

A suspicious URL may be identified from the detected URLs at step 420. A URL may be identified as suspicious if the URL does not match a black list of URLs or a white list of URLs maintained at electronic message malware detection system 150 (or accessible by detection module 150). Identifying suspicious URLs is discussed in more detail below with respect to the method of FIG. 5.

Suspicious URLs are analyzed using virtual environment components to detect a malicious URL at step 425. Analyzing a suspicious URL may include selecting virtual components such as a virtual operating system, virtual applications, and virtual network, populating and configuring a virtual environment with the virtual components, and processing the URL within the virtual environment. Processing the URL within the environment may include replaying the URL within the virtual environment by performing a "click" operation on the URL. The URL may be identified as malicious if content received in response to the click operation on the URL results in an undesirable behavior within the virtual environment. An undesirable behavior may include attempts to change an operating system setting or configuration, execute an executable file within the virtual environment, transmit undesirable data, or other actions. In some embodiments, an undesirable behavior may include an unexpected behavior. If no undesirable behavior occurs in response to clicking the URL, the URL is determined to be acceptable and is added to a white list.

A malware detection system may be updated based on the detected malware URL at step 430. Updating may include communicating the malicious URL to other parts of a system. For example, electronic message malware detection system 150 may communicate one or more malicious URLs to management server 170, and server 170 may communicate the URL via an updated black list to web malware detection systems and electronic message malware detection systems within system 100. Updating a malware detection system is described in more detail below with respect to the method of FIG. 7.

One or more factors may affect how a URL is determined to be suspicious and/or processed to determine if it is associated with malware. In an embodiment, any URL detected in an email may be transmitted by electronic message malware detection 150 to web malware detection 130. Upon detecting that content is being requested from the URL, for example in response to a user selection or "click" on the URL, the web malware detection 130 may increase the priority of the detected URL such that the URL is analyzed to determine if is suspicious and/or associated with malware. In this embodiment, the URL may not be processed by the web malware detection 130 until it is determined that content is actually being requested from the URL.

Figure 5:
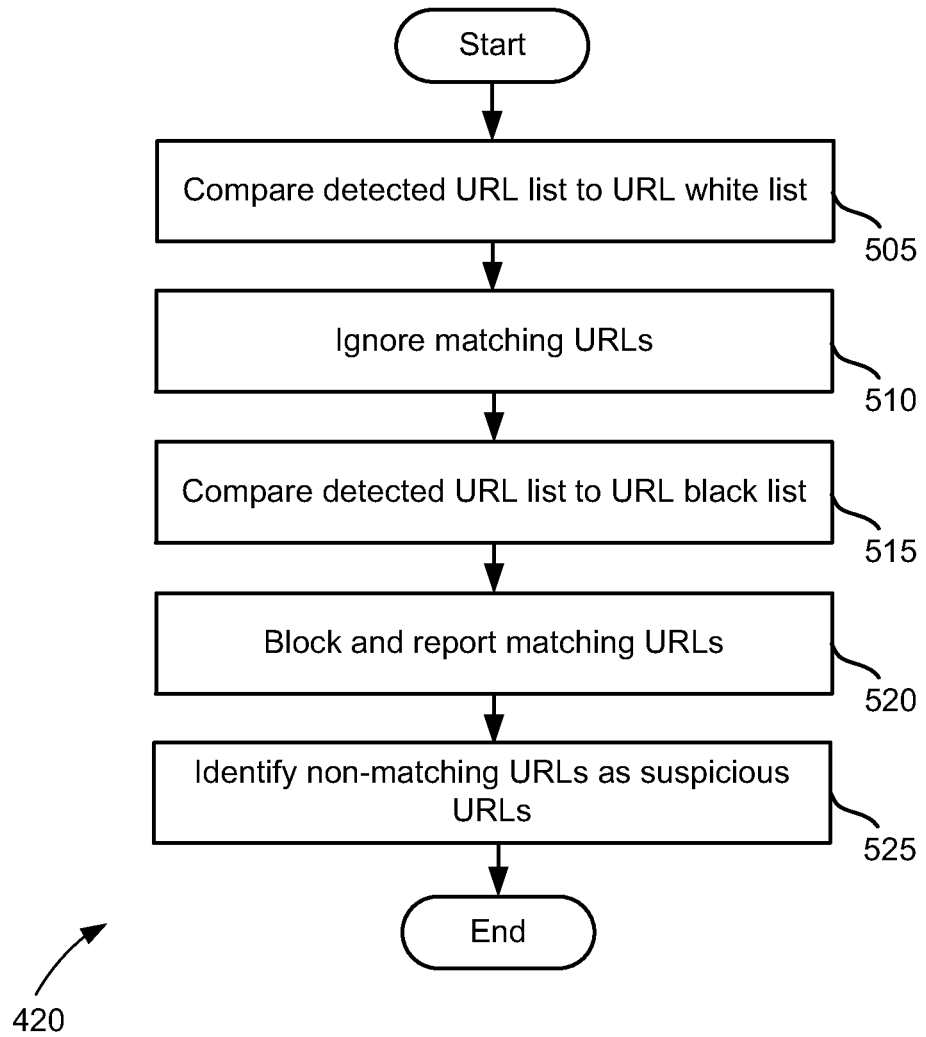
FIG. 5 is a flowchart of an exemplary method for identifying a suspicious URL.

A large number of URLs may be detected by web malware detection 130 in network traffic travelling through firewall 120. One or more detected URLs detected by web malware detection 130 may be assigned a priority for analysis. Higher prioritized URLs are analyzed to determine if they are suspicious or associated with malware before lower priority URLs. In some embodiments, URLs detected in email are provided a lower priority than those detected as part of network traffic by web malware detection 130. The priority of a URL may be increased once it is determined to be present in both an email and network traffic (i.e., detected by both electronic message malware detection 150 and web malware detection 130, in any order). The level of priority increase may depend on the resources available to process URLs. For example, the level of priority increase may be less if there are a small number of virtual environments or components available to process a suspicious URL. If there is a large number of virtual environments and/or virtual components available to process a URL, there may be a large level of priority increase. Hence, the priority of URLS to be processed by may adjusted in such a way to avoid degradation of the normal functioning of web malware detection 130 under heavy load, while allowing thorough examination of all email URLs where load permits FIG. 5 is a flowchart of an exemplary method for identifying a suspicious URL. In some embodiments, the method of FIG. 5 provides more detail for step 420 in the method of FIG. 4. Each detected URL in an electronic message is compared to a URL white list at step 505. The URL white list may be maintained on electronic message malware detection system 150 and may include a list of acceptable URLs or URL domains. URLs that match the URL white list are ignored at step 510. The URLs that match the white list are determined to not be malicious and therefore are allowed to pass through to their intended client device.

Detected URLs which are not on the white list are then compared to the URL black list at step 515. URLs on the black list are known to be malicious and should not be passed through to a user associated with a client device. If a detected URL matches a URL on the black list, the URL is blocked and reported at step 520, and thereby prevented from being provided to the recipient client device. A URL may be prevented from delivery by either blocking transmission of the entire electronic message, removing the URL from the electronic message, or in some other manner. URLs that do not match a URL on the white list or a URL on the black list are identified as suspicious URLs at step 526. The remaining URLs are characterized as suspicious because it is unknown whether they are acceptable or malicious.

Figure 6:
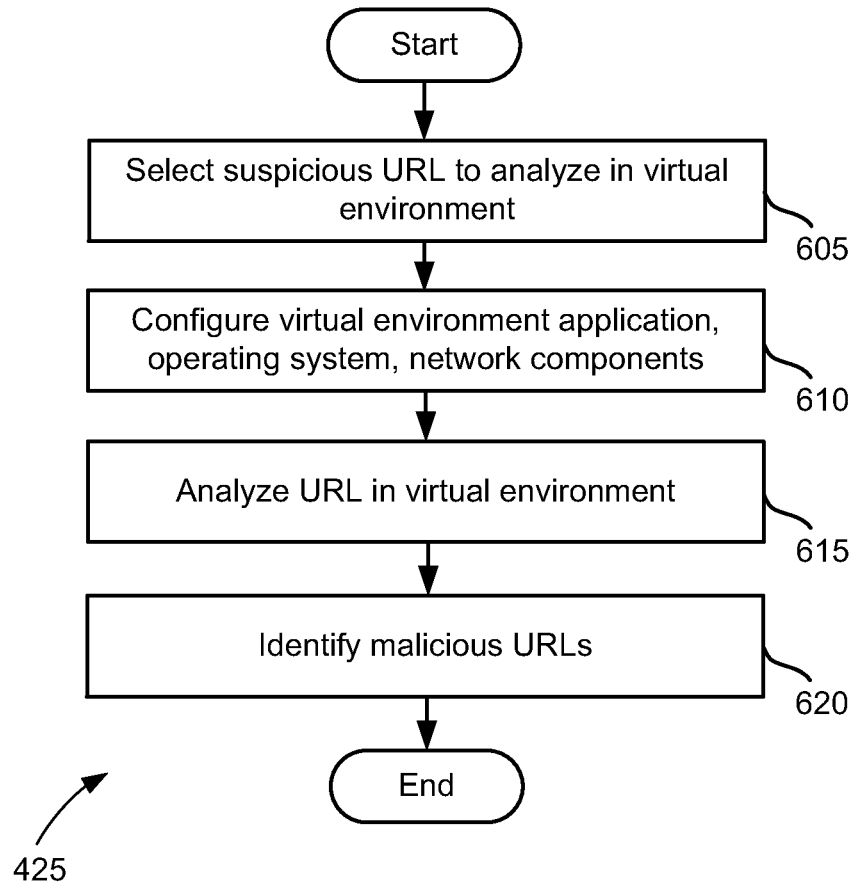
FIG. 6 is a flowchart of an exemplary method for identifying suspicious URLs.

FIG. 6 is a flowchart of an exemplary method for identifying malicious URLs. The method of FIG. 6 provides more detail for step 525 of the method of FIG. 5. First, a suspicious URL is selected to analyze in a virtual environment at step 605. Some URLs may be weighted with a higher priority to analyze. The higher priority URLs may be placed in a higher priority position in an analysis queue as opposed to lower priority URLs. A priority may be associated with a URL by a user, based on learning performed by the present system, or in some other manner. The priority may be associated with the URL domain, keywords in the URL, positioning within the electronic message for the URL, or other factors.

The present system may configure a virtual environment application, operating system, and network components at step 610. These virtual components may be retrieved from a component pool by a scheduler. A URL may be analyzed in the virtual environment configured with the virtual components at step 615. Analyzing the URL may include replaying the URL by performing a "click" operation on the URL within the virtual environment. Upon performing the click operation, an application may send a content request message to the URL and receive a response message in response to the URL request. For example, a network browser may be executed to provide the content received in response to the URL response received by the application. Actions performed within the virtual environment in response to receiving the URL content may be recorded and analyzed to determine if the URL is malicious.

A malicious URL may be identified at step 620. An identification as a malicious URL may be based on actions or changes that occur when a suspicious URL is replayed in the virtual environment. Actions that may indicate a malicious URL include changing an operating system configuration, performing requests or trying to install or execute file, or other actions performed in response to retrieving content from the URL location.

Figure 7:
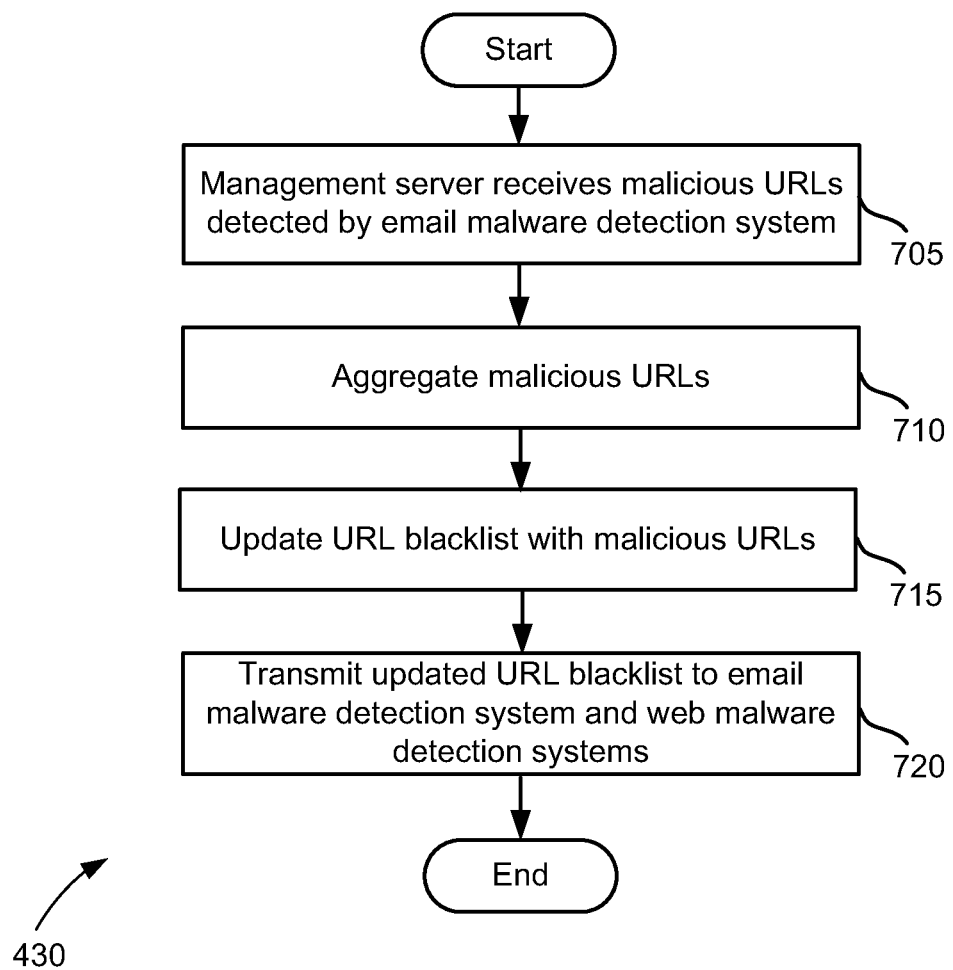
FIG. 7 is a flowchart of an exemplary method for updating a malware detection system.

FIG. 7 is a flowchart of an exemplary method for updating a malware detection system. The method of FIG. 7 provides more detail for step 430 of the method of FIG. 4. First, a management server receives a malicious URL detected by electronic message malware detection system at step 705. The malicious URLs are then aggregated by the management server at step 710. A URL black list is updated with the aggregated malicious URLs at step 715. The management server may then transmit the updated URL black list to electronic message malware detection systems and web malware detection systems at step 720. The transmission of the updated URL black list may be performed upon request, periodically, or upon occurrence of a particular event, such as when a URL black list has undergone a threshold number of changes.

In some applications of this technology, it may not be desired to fetch content from every URL seen in incoming electronic messages where such "clicks" may have undesired side effects on applications using the web (HTTP) as a communication protocol. Therefore, an alternative method can be used in such cases, in which all URLs received in electronic messages are forwarded to a web malware detection system, and are used to raise the probability of examining any particular piece of web content if it has previously been seen in electronic messages (e.g., email). Thus "targeted spear phishing" attacks in which malicious URLs are sent to particular email addresses in an effort to induce the recipient to click on the link will be examined by the malware detection system only in the event that the recipient does actually so click.

Since many URLs seen in electronic messages are also accessed via the web, the present invention also includes a dynamic method for setting the "email priority boost" used to enhance the priority of inspecting web content by noting the fraction of all the efforts of the web malware detection system devoted to examining URLs previously seen by the electronic message malware detection system. This "email priority boost" can be regulated to target a particular fraction of the virtual execution environments available on the web malware detection system, to avoid overloading the latter and causing loss of other web detection functionality, while still allowing complete examination of URLS seen in electronic messages where system load allows.

Figure 8:
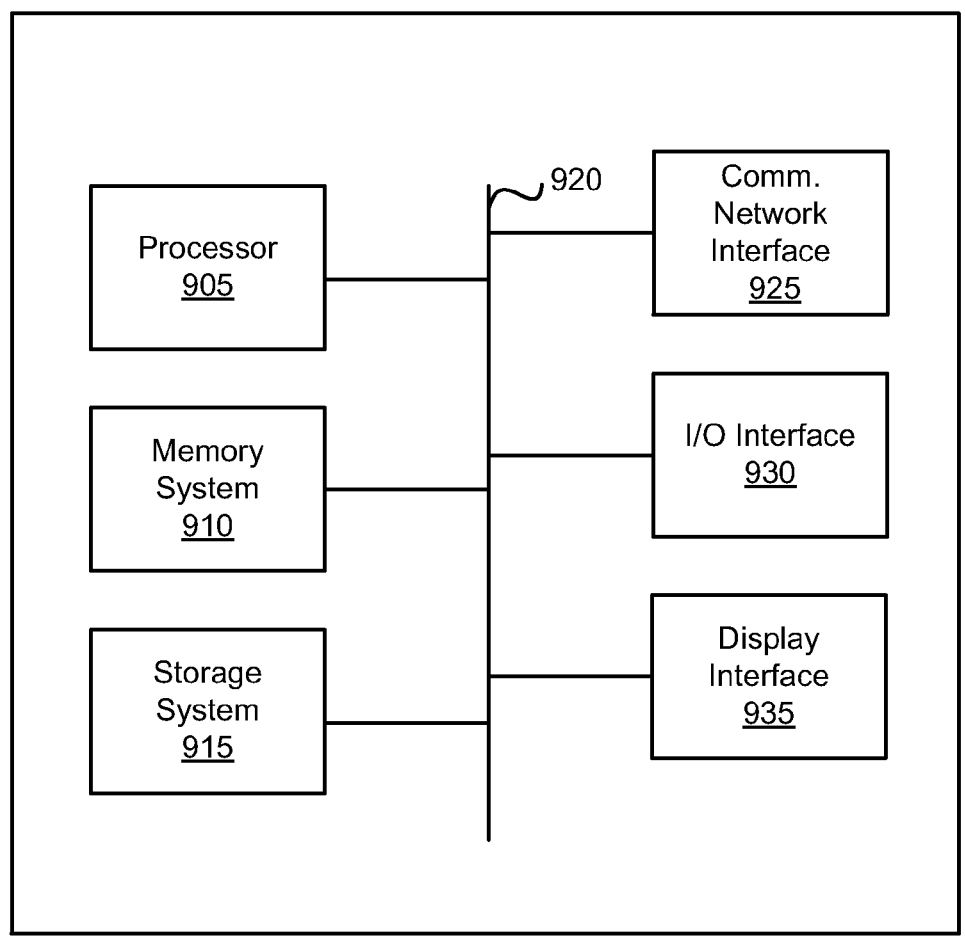
FIG. 8 is a block diagram of an exemplary computing device.

FIG. 8 is a block diagram of an exemplary computing device. The computing device of FIG. 8 may be used to implement one or more devices in the system 100 of FIG. 1, including but not limited to firewall 120, web malware detection 130, e-mail server 140, e-mail malware detection 150, management server 170, exchange server 160, or clients 182-186 FIG. 8 is a block diagram of an exemplary malicious network content detection device. In some embodiments, the method of FIG. 8 provides more detail for malicious network content detection system 125 of FIG. 1. Malicious network content detection system 125 comprises at least one or more processors 805, memory systems 810, and storage systems 815, each of which can be communicatively coupled with data bus 820. In some embodiments, data bus 820 may be implemented as one or more data buses. Malicious network content detection system 125 may also comprise communication network interface 825, input/output (I/O) interface 830, and display interface 835. Communication network interface 825 may be communicatively coupled with network 120 via communication medium 840. In some embodiments, malicious network content detection system 125 may be communicatively coupled with a network tap, such as network tap 115, which in turn may be communicatively coupled with network 120. Bus 920 provides communications between communications network interface 825, processor 805, memory system 810, storage system 815, I/O interface 830, and display interface 835.

Communications network interface 825 may communicate with other digital devices (not shown) via communications medium 840. Processor 905 executes instructions which may be stored on a processor-readable storage medium. Memory system 810 may store data permanently or temporarily. Some examples of memory system 810 include RAM and ROM. Storage system 815 also permanently or temporarily stores data. Some examples of storage system 815 are hard discs and disc drives. I/O interface 830 may include any device that can receive input and provide output to a user. I/O interface 830 may include, but is not limited to, a keyboard, a mouse, a touch screen, a keypad, a biosensor, a compact disc (CD) drive, a digital video disc (DVD) drive, an optical disk drive, or a floppy disk drive. Display interface 835 may include an interface configured to support a display, monitor, or screen. In some embodiments, malicious network content detection system 125 comprises a graphical user interface to be displayed to a user over a monitor in order to allow the user to control malicious network content detection system 125.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A computer implemented method for detecting malicious network content by a network content processing system, comprising:
   receiving an electronic email message;
   analyzing the electronic email message to detect a uniform resource locator (URL) address within message content of the electronic email message;
   determining whether the detected URL address within the message content is suspicious;
   in response to a determination that the detected URL address is suspicious, executing, with a computer processing system, the suspicious URL address detected within the message content of the electronic email message, wherein executing the suspicious URL address comprises executing, within a virtual environment, web content received in response to a request for the web content; and
   identifying the suspicious URL address detected within the electronic email message content as malicious based on results of the executing of the suspicious URL address detected within the electronic email message content in the virtual environment.

2. The method of claim 1, further comprising:
   comparing the detected URL address to a first list of URLs; and
   identifying the detected URL address as suspicious if the detected URL address is not in the first list of URLs.

3. The method of claim 2, wherein the first list includes URLs associated with malware.

4. The method of claim 2, wherein the first list includes URLs known to not be associated with malware.

5. The method of claim 2, further comprising transmitting one or more malicious URL addresses to a remote device, the remote device configured to receive the one or more malicious URL addresses, consolidating malicious URL addresses, and transmitting an updated list of URL addresses associated with the malicious URL addresses.

6. The method of claim 5, further comprising:
receiving one or more detected URL addresses from an electronic message malware detection system at a web malware detection system; and
raising a priority associated with examining one or more of the detected URL addresses received from a network by the web malware detection system, the priority raised based on the received one or more detected URL addresses.

7. The method of claim 6, further comprising:
dynamically adjusting a priority for processing URL addresses detected within an email based on the web malware detection system load.

8. The method of claim 1, wherein the virtual environment comprises a virtual application component, one type of virtual application component comprises a virtual network browser application.

9. The method of claim 8, wherein the detected URL address is determined to be suspicious by an electronic message malware detection device, and the detected URL address determined to be suspicious is identified as malicious by a web malware detection device.

10. The method of claim 6, wherein the detected URL address determined to be suspicious is transmitted from the electronic message malware detection device to the web malware detection device.

11. The method of claim 1, further comprising:
configuring a virtual environment component within a virtual environment to provide a real application configured to process suspicious network content comprising the web content corresponding to the suspicious URL address, the virtual environment configured within a network content processing system;
processing the suspicious network content using the virtual environment component within the virtual environment; and
identifying the suspicious network content as malicious network content based on a behavior of the virtual environment component.

12. The method of claim 11, where the suspicious network content includes a file attached to an electronic message, the virtual environment component including an application configured to process the file.

13. The method of claim 12, where the file is a Microsoft Word type document, the virtual environment component including a Microsoft Word program.

14. The method of claim 12, where the file is a Microsoft Excel type document, the virtual environment component including a Microsoft Excel program.

15. The method of claim 12, where the file is a Microsoft Powerpoint type document, the virtual environment component including a Microsoft Powerpoint program.

16. The method of claim 12, where the file is a Portable Document Format (PDF) document, the virtual environment component including an Adobe PDF Reader program.

17. The method of claim 1, further comprising monitoring changes to a virtual environment operating system by an agent, the suspicious URL address detected within the message content of the electronic email message identified as malicious based on detected improper changes to the virtual environment operating system.

18. The method of claim 1, wherein the suspicious URL address is identified as malicious when results of the executing of the suspicious URL address indicate malicious network content is embedded within data associated with a web page referenced by the suspicious URL address.

19. The method of claim 1, wherein executing the suspicious URL address further comprises:
configuring a web browser in the virtual environment; and
sending the content request to the suspicious URL address by the web browser in the virtual environment.

20. The method of claim 1, wherein the received electronic email message is a copy of an electronic email message delivered to a recipient.

21. The method of claim 1, wherein the message content is an electronic email message attachment.

22. The method of claim 1, wherein the virtual environment simulates a particular client device targeted to receive the electronic email message and comprises an operating system corresponding to an operating system of the particular client device.

23. The method of claim 1, wherein the virtual environment simulates a particular client device targeted to receive the electronic email message and comprises an application corresponding to an application that controls selecting of the URL.

24. The method of claim 1, wherein the results of the executing of the suspicious URL address comprises an occurrence of one or more undesirable behaviors during execution of the web content received in response to the request, the one or more undesirable behaviors comprises an attempt to install or execute a file.

25. The method of claim 1, wherein the results of the executing of the suspicious URL address comprises actions that occur responsive to processing of the web content within the virtual environment, the actions include at least changing a configuration of an operating system of the virtual environment.

26. The method of claim 1, wherein:
the analyzing of the electronic email message comprises detecting a plurality of URL addresses including the URL address and assigning priority for analysis to each of the plurality of URL addresses; and
the determining whether the detected URL address within the message content is suspicious comprises determining whether a first URL address of the plurality of URL addresses is suspicious prior to determining whether a second URL of the plurality of URL addresses is suspicious when the first URL address is assigned a higher priority than the second URL address.

27. The method of claim 26, wherein the executing of the first URL address being the suspicious URL address and the identifying the suspicious URL address as malicious is conducted prior to the determining whether the second URL address within the message content is suspicious.

28. A non-transitory computer readable storage medium implemented within a computing device and having stored thereon instructions that, when executed by a processor, performs operations for detecting malicious network content, comprising:
receiving an electronic email message;
analyzing the electronic email message to detect a uniform resource locator (URL) address within message content of the electronic email message;

determining whether the detected URL address within the message content is suspicious;

in response to a determination that the detected URL address is suspicious, executing the suspicious URL address detected within the message content of the electronic email message, wherein executing the suspicious URL address comprises executing, within a virtual environment, web content received in response to a request for the web content; and identifying the suspicious URL address detected within the electronic email message content as malicious based on results of the executing of the suspicious URL address detected within the electronic email message content in the virtual environment.

29. The non-transitory computer readable storage medium of claim 28, where the instructions upon execution by the processor, perform further operations comprising:

comparing the detected URL address to a first list of URLs; and identifying the detected URL address as suspicious if the detected URL address is not in the first list of URLs.

30. The non-transitory computer readable storage medium of claim 29, wherein the first list includes URLs associated with malware.

31. The non-transitory computer readable storage medium of claim 29, wherein the first list includes URLs known to not be associated with malware.

32. The non-transitory computer readable storage medium of claim 28, wherein the virtual application component is a virtual network browser application.

33. The non-transitory computer readable storage medium of claim 28, wherein the detected URL address is determined to be suspicious by an electronic message malware detection device, and the detected URL address determined to be suspicious is identified as malicious by a web malware detection device.

34. The non-transitory computer readable storage medium of claim 28, wherein the virtual environment simulates a particular client device targeted to receive the electronic email message and comprises an operating system corresponding to an operating system of the particular client device.

35. The non-transitory computer readable storage medium of claim 28, wherein the results of the executing of the suspicious URL address comprises an occurrence of one or more undesirable behaviors during execution of the web content received in response to the request.

36. The non-transitory computer readable storage medium of claim 35, wherein the one or more undesirable behaviors include an attempt to transmit data from the computing device.

37. The non-transitory computer readable storage medium of claim 28, wherein the instructions, when executed by a processor, perform operations comprising:

the analyzing of the electronic email message comprises detecting a plurality of URL addresses including the URL address and assigning priority for analysis to each of the plurality of URL addresses; and the determining whether the detected URL address being the first URL address is suspicious and the identifying that the first URL address is malicious occurs prior to determining whether a second URL of the plurality of URL addresses is suspicious, when the first URL address is assigned a higher priority than the second URL address.

38. A system for detecting malicious network content, comprising:

a memory; and a processor coupled with the memory and configured to receive an electronic email message;

an electronic message malware detector comprising the processor and configured to analyze the electronic email message to detect a uniform resource locator (URL) address within message content of the electronic email message, and determine whether the detected URL address within the message content is suspicious;

a web malware detector coupled with the electronic message malware detector and configured to in response to a determination that the detected URL address is suspicious, execute the suspicious URL address detected within the message content of the electronic email message, wherein executing the suspicious URL address comprises executing, within a virtual environment, web content received in response to a request for the web content, and identifying the suspicious URL address detected within the electronic email message content as malicious based on results of the executing of the suspicious URL address detected within the electronic email message content in the virtual environment.

39. The system of claim 38, wherein the processor is further configured to execute the electronic malware detection logic to compare the detected URL address to a first list of URLs, and identify the detected URL address as suspicious if the detected URL address is not in the first list of URLs.

40. The system of claim 39, wherein the first list includes URLs associated with malware.

41. The system of claim 39, wherein the first list includes URLs known to not be associated with malware.

42. The system of claim 39, further comprising a computing device including the electronic message malware detector and the web malware detector.

43. The system of claim 38, wherein the virtual application component is a virtual network browser application.

44. The system of claim 38, wherein the web malware detector comprises a virtual environment component within the virtual environment that provides a real application configured to process suspicious network content comprising the web content corresponding to the suspicious URL address, the virtual environment configured within a network content processing system; and wherein the web malware detector is further configured to process the suspicious network content using the virtual environment component within the virtual environment, and to identify the suspicious network content as malicious network content based on a behavior of the virtual environment component.

45. The system of claim 44, wherein the web malware detector further comprises monitoring changes to the virtual environment by an agent, the suspicious URL address detected within the message content of the electronic email message identified as malicious based on detected improper changes to the virtual environment.

46. The system of claim 38, wherein the web malware detector to execute the web content within the virtual environment that simulates a particular client device targeted to receive the electronic email message and comprises an operating system corresponding to an operating system of the particular client device.

47. The system of claim 38, wherein the results of the executing of the suspicious URL address by the web malware detector comprises an occurrence of one or more undesirable behaviors during execution of the web content received in response to the request, the one or more undesirable behaviors comprises an attempt to install or execute a file.

48. The system of claim 38, wherein the results of the executing of the suspicious URL address by the web malware detector comprises an occurrence of one or more undesirable behaviors during execution of the web content received in response to the request, the one or more undesirable behaviors comprises changing of a registry value.

49. The system of claim 38, wherein the results of the executing of the suspicious URL address by the web malware detector that includes execution of the web content comprises actions that occur responsive to processing of the web content within the virtual environment, the actions include at least changing a configuration of an operating system of the virtual environment.

50. The system of claim 38, wherein:
the analyzing of the electronic email message by the electronic message malware detector comprises detecting a plurality of URL addresses including the detected URL address and assigning priority for analysis to each of the plurality of URL addresses; and
the determining whether the detected URL address is suspicious by the electronic message malware detector comprises determining whether a first URL address of the plurality of URL addresses is suspicious prior to determining whether a second URL of the plurality of URL addresses is suspicious when the first URL address is assigned a higher priority than the second URL address.

51. The system of claim 50, wherein the executing of the first URL address being the suspicious URL address and the identifying the suspicious URL address as malicious by the web malware detector is conducted prior to the determining whether the second URL address within the message content is suspicious by the electronic message malware detector.

* * * * *